US010749925B1

(12) United States Patent
Hudgin et al.

(10) Patent No.: US 10,749,925 B1
(45) Date of Patent: Aug. 18, 2020

(54) VIDEO STREAMING OPTIMIZATION FOR QUICK START OF VIDEO DISPLAY

(71) Applicant: Snap Inc., Santa Monica, CA (US)

(72) Inventors: Darryl Hudgin, Venice, CA (US); Michael Eisel, Venice, CA (US)

(73) Assignee: Snap Inc., Santa Monica, CA (US)

( * ) Notice: Subject to any disclaimer, the term of this patent is extended or adjusted under 35 U.S.C. 154(b) by 136 days.

(21) Appl. No.: 15/255,322

(22) Filed: Sep. 2, 2016

(51) Int. Cl.
| | | |
|---|---|---|
| G06F 15/167 | (2006.01) | |
| H04L 29/06 | (2006.01) | |
| H04L 29/08 | (2006.01) | |
| H04L 12/58 | (2006.01) | |
| H04N 21/24 | (2011.01) | |
| H04N 21/231 | (2011.01) | |

(52) U.S. Cl.
CPC ............ *H04L 65/602* (2013.01); *H04L 51/32* (2013.01); *H04L 65/4084* (2013.01); *H04L 67/02* (2013.01); *H04L 67/2809* (2013.01); *H04L 67/42* (2013.01); *H04L 67/20* (2013.01); *H04N 21/231* (2013.01); *H04N 21/2402* (2013.01)

(58) Field of Classification Search
CPC ........... H04N 21/8456; H04N 21/2183; H04N 21/222; H04N 21/23106; H04N 21/8455; H04N 21/2402; H04N 21/231; H04L 65/602; H04L 67/2809; H04L 65/4084; H04L 67/42; H04L 67/02; H04L 51/32; H04L 67/20
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |
| 7,173,651 B1 | 2/2007 | Knowles |

(Continued)

FOREIGN PATENT DOCUMENTS

| | | |
|---|---|---|
| CA | 2887596 A1 | 7/2015 |
| WO | WO-2015013411 A1 | 1/2015 |

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

*Primary Examiner* — Chris Parry
*Assistant Examiner* — Stephen J Houlihan
(74) *Attorney, Agent, or Firm* — Schwegman Lundberg & Woessner, P.A.

(57) ABSTRACT

Methods, systems, and computer programs are presented for streaming a video. One method includes an operation for initializing, at a client device, a hypertext transfer protocol (HTTP) server for processing streaming video requests from a streaming video application. Further, the method includes an operation for receiving a bundle that includes bundle files, which include manifest files of a manifest for streaming a video and video files having video data. The method further includes operations for caching the bundle files in memory, and for intercepting, at the HTTP server, a request for a file from the streaming video application. When the file is cached in the memory, the file is returned from the memory; otherwise, the HTTP server acts as a proxy by forwarding the request to a video server and then returning the file to the streaming video application after the file is received from the remote server.

18 Claims, 9 Drawing Sheets

(56) References Cited

U.S. PATENT DOCUMENTS

| | | |
|---|---|---|
| 7,346,649 B1 * | 3/2008 | Wong .................. G06F 16/9535 709/203 |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,402,556 B2 | 3/2013 | Bradley |
| 8,718,333 B2 | 5/2014 | Wolf et al. |
| 8,724,622 B2 | 5/2014 | Rojas |
| 8,874,677 B2 | 10/2014 | Rosen et al. |
| 8,887,306 B1 * | 11/2014 | Palacio .......... H04N 21/234336 713/182 |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 10,148,716 B1 * | 12/2018 | Joseph .................. G06F 16/16 |
| 2011/0202598 A1 | 8/2011 | Evans et al. |
| 2012/0042048 A1 * | 2/2012 | Taubman .................. G06T 9/00 709/219 |
| 2012/0209924 A1 | 8/2012 | Evans et al. |
| 2013/0054728 A1 * | 2/2013 | Amir .................. H04N 21/2183 709/213 |
| 2014/0279852 A1 | 9/2014 | Chen |
| 2014/0282750 A1 * | 9/2014 | Civiletto ............ H04N 21/2747 725/74 |
| 2014/0372624 A1 * | 12/2014 | Wang ...................... H04L 65/60 709/231 |
| 2015/0007239 A1 | 1/2015 | Cranman et al. |
| 2016/0072637 A1 * | 3/2016 | Gholmieh ............ H04L 65/4076 709/219 |
| 2016/0142752 A1 * | 5/2016 | Ohno .................. H04N 21/2402 725/116 |

* cited by examiner

US 10,749,925 B1

VIDEO STREAMING OPTIMIZATION FOR QUICK START OF VIDEO DISPLAY

TECHNICAL FIELD

The subject matter disclosed herein generally relates to methods, systems, and programs for streaming video. For example, some embodiments of the present disclosure relate to improving the performance of streaming video to a mobile device, and to reducing the amount of time a user has to wait before the video starts streaming.

BACKGROUND

Most portable devices include capabilities for streaming video downloaded from the Internet. Typically, the portable device operating system provides a streaming video player, and the applications that execute on the portable device interface with the streaming video player for delivering video.

Streaming the video often includes downloading files (e.g., manifest files) with information about the location of the video data and then downloading the video data. This process may cause video delivery to appear slow, especially at the beginning of the video stream display, more so when the portable device is in a network environment with low bandwidth (e.g., utilizing cellular data). This may result in frustration for the user, who may blame the application for the low performance.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
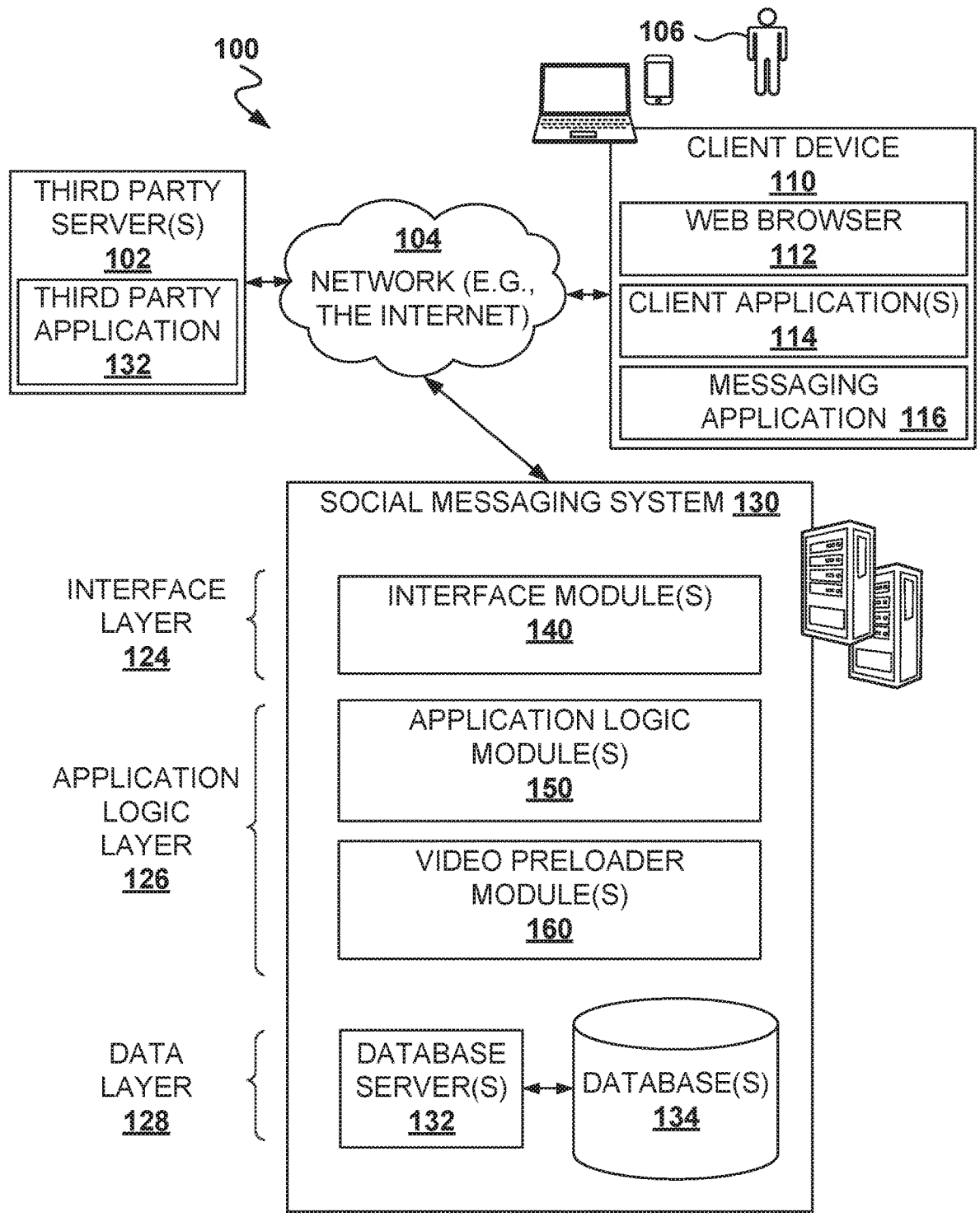
FIG. 1 is a block diagram illustrating a network system, according to some example embodiments.

Example methods, systems, and computer programs for streaming video are provided. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some applications executing on portable devices do not have streaming capabilities. Therefore, they have to use the video streaming application present in the portable device. It is difficult for the application to cache video data because the application does not control the streaming of the video data. Further, even if it were possible to cache data, it may not be possible for the application to cache a complete video stream, as the portable device may not have enough memory, or the application may not be able to reserve enough storage in the portable device.

In some example embodiments, a streaming video starts playing immediately after a user requests the video, even if an application initiating the streaming does not have streaming capabilities and has limited ability to cache video data. In many portable devices, streaming media players included with the portable devices need to fetch a manifest file (e.g., a manifest according to the Hypertext Transfer Protocol (HTTP) Live Streaming (HLS) protocol), which describes how to obtain the video data for the video, and once the manifest file is downloaded, the streaming media player begins downloading the video data by downloading video data files. Once enough video data is available for display, the video begins to display for the user. Therefore, before starting to display the video, many files may have to be downloaded, which may cause a slow start.

In some example embodiments, these problems are addressed by preloading the manifest file and a small amount of video data to start presenting the video on the display (e.g., the first 10 or 20 seconds), and by implementing an HTTP server that may serve the preloaded information or act as a proxy to retrieve files from a remote video server. The HTTP server, in some example embodiments, is embedded in the application, allowing the application to act as the source of video media.

A bundle file is pre-downloaded to the client device, and the bundle file includes the manifest files and the first few requests worth of video media. After pre-downloading the bundle to the client, the HTTP server intercepts requests originating from the video player for these files, and the HTTP server returns these files right away for a quick video start, thus avoiding or reducing the typical initial start-up cost of the streaming video player. The local HTTP server requests assets from the remote video server if the assets are not available in the client cache.

One general aspect includes a method for streaming video. The method includes an operation for initializing, at a client device, an HTTP server for processing streaming video requests originated by a streaming video application at the client device. The method also includes receiving a bundle at the client device, the bundle including bundle files, the bundle files including manifest files of a manifest for streaming a video and one or more video files having video data for corresponding segments of the video. The method further includes operations for caching the bundle files in memory, and for intercepting, at the HTTP server, a request for a file from the streaming video application. When the file is cached in the memory, the file is returned from the memory, and when the file is absent from the memory, the HTTP server acts as a proxy by forwarding the request to a video server and returning the file to the streaming video application after the file is received from the video server.

Another aspect includes a client device including a memory having instructions, and one or more computer processors. The instructions, when executed by the one or more computer processors, cause the one or more computer processors to perform operations that include initializing an HTTP server for processing streaming video requests originated by a streaming video application at the client device. The client device receives a bundle including bundle files, the bundle files including manifest files of a manifest for streaming a video and one or more video files having video data for corresponding segments of the video. The client device caches the bundle files in the memory and intercepts, at the HTTP server, a request for a file from the streaming video application. When the file is cached in the memory, the file is returned from the memory, and when the file is absent from the memory, the HTTP server acts as a proxy by forwarding the request to a video server and returning the file to the streaming video application after the file is received from the video server.

One general aspect includes a non-transitory machine-readable storage medium including instructions that, when executed by a machine, cause the machine to perform operations that include initializing, at a client device, an HTTP server for processing streaming video requests originated by a streaming video application at the client device. The operations further include receiving a bundle at the client device, the bundle including bundle files, the bundle files including manifest files of a manifest for streaming a video and one or more video files having video data for corresponding segments of the video. The operations further include caching the bundle files in memory, and intercepting, at the HTTP server, a request for a file from the streaming video application. When the file is cached in the memory, the file is returned from the memory, and when the file is absent from the memory, the HTTP server acts as a proxy by forwarding the request to a video server and returning the file to the streaming video application after the file is received from the video server.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geographic location, etc.) and aspects (e.g., transferring communications data, receiving and transmitting indications of communication sessions, etc.) associated with the network system 100 and its users. Although the network system 100 is illustrated herein as having a client-server architecture, other embodiments may include other network architectures, such as peer-to-peer or distributed network environments.

The network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as having a three-tiered architecture, the inventive subject matter is by no means limited to such an architecture.

The interface layer 124 consists of interface modules 140 (e.g., a web server), which receive requests from various client-computing devices and servers, such as client devices 110 executing client application(s) 114, and third-party servers 102 executing third-party application(s) 132. In response to the received requests, the interface modules 140 communicate appropriate responses to requesting devices via a network 104. For example, the interface modules 140 can receive requests such as HTTP requests, or other web-based, Application Programming Interface (API) requests.

The client devices 110 can execute conventional web browsers 112, or messaging applications 116, or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client application(s) 114. The client application(s) 114 can provide functionality to present information to a user 106 and communicate via the network 104 to exchange information with the social messaging system 130.

In one example, the client applications 114 include a social messaging app such as SNAPCHAT® that, consistent with some embodiments, allows users to exchange ephemeral messages that include media content, including video messages or text messages. In this example, the social messaging app can incorporate aspects of embodiments described herein. The ephemeral messages are deleted following a deletion trigger event such as a viewing time or viewing completion. In such embodiments, a device uses the various components described herein within the context of any of generating, sending, receiving, or displaying aspects of an ephemeral message.

Each of the client devices 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client devices 110. In some embodiments, the user 106 interacts with the social messaging system 130 via the client devices 110. The user 106 may not be part of the network system 100, but may be associated with the client devices 110.

The data layer 128 has database servers 132 that facilitate access to information storage repositories or databases 134. The databases 134 are storage devices that store data such as member profile data, social graph data (e.g., relationships between members of the social messaging system 130), and other user data.

The application logic layer 126 includes video preloader modules 160, capable of gathering video data and preloading the video data to the client devices 110, and various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented using one or more of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

Figure 2:
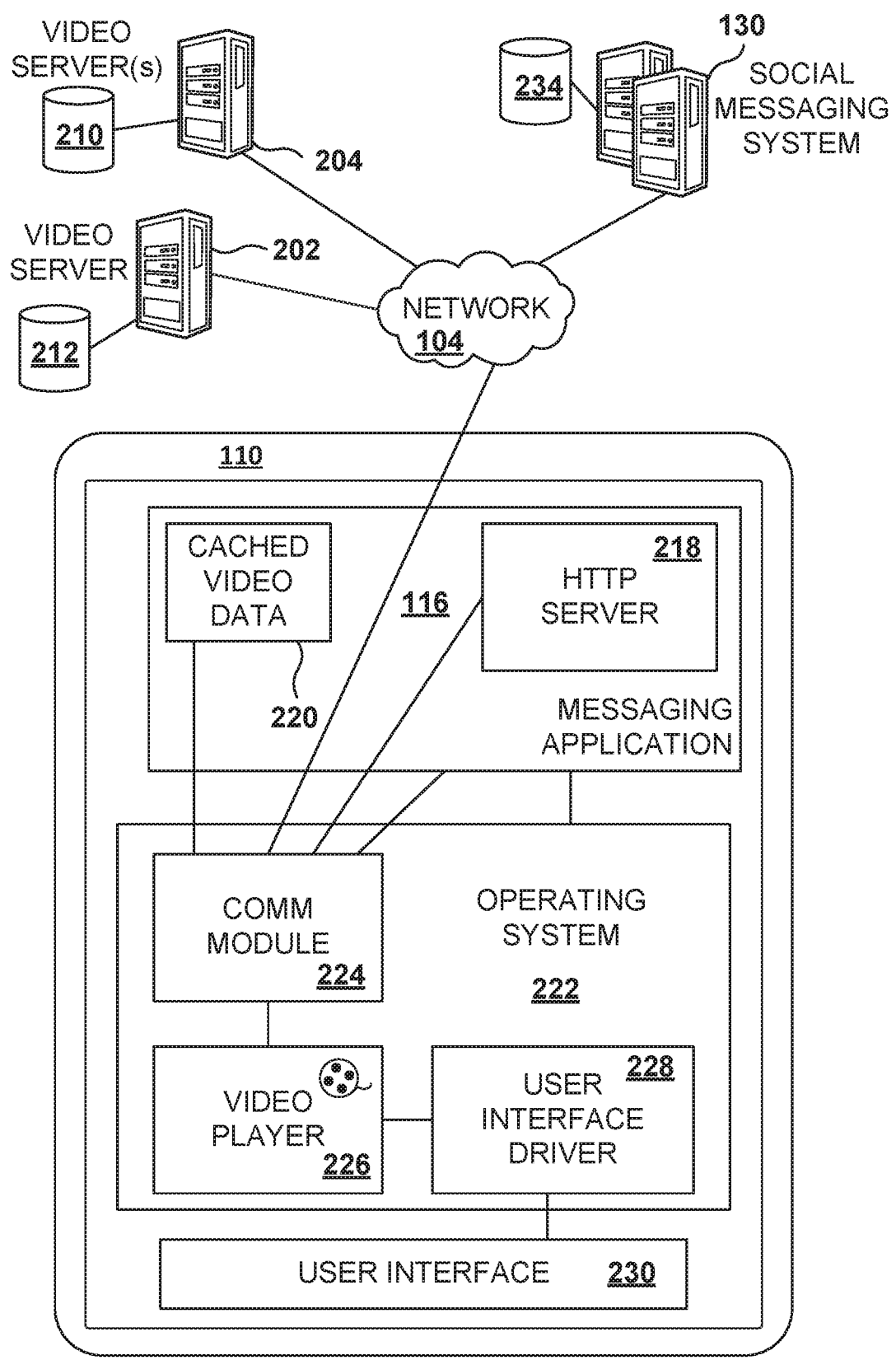
FIG. 2 illustrates some system components for streaming video, according to some example embodiments.

FIG. 2 illustrates some system components for streaming video, according to some example embodiments. In some example embodiments, the client device 110 interacts, over the network 104, with the social messaging system 130 and one or more video servers 202 and 204, which have access to respective video databases 210 and 212. The social messaging system 130 may also include a bundle database 234, which may be used to store video bundles for downloading to the client devices 110. More information regarding the structure of a bundle is provided below with reference to FIG. 3.

In some example embodiments, the client device 110 includes the messaging application 116, an operating system 222, and a user interface 230, which is presented on a display of the client device 110. The operating system 222 includes a communication module 224, a video player 226, and a user interface driver 228. The communication module 224 provides access to different types of network communications, as described in more detail below with reference to FIG. 9.

The video player 226 provides capability for presenting video on the user interface 230, and the video may be a video stored in the client device 110, a video provided by an application executing on the client device 110 (e.g., messaging application 116), or a request to stream a video from a network location. The user interface driver 228 provides the interface allowing the operating system 222 and other applications executing on the client device 110 to access the user interface 230 presented on the display. In one example embodiment, the messaging application 116 includes cached video data 220 and an HTTP server 218.

In one example embodiment, the video player 226 starts playing the video at low resolution, while it downloads in parallel a higher-quality version of the video. This way, the video can start playing faster, because it takes less time to download the low-resolution video data than the high-resolution video data. Later, as the high-resolution data becomes available, the video may switch to a high-resolution display.

In one example embodiment, the messaging application 116 relies on the video player 226 to display the video. If the messaging application 116 caches the video data, there is no mechanism to notify the video player 226 (e.g., iOS media player) that the video data has been preloaded. To solve this problem, the messaging application 116 notifies the video player 226 that the video to be displayed (including the manifest) is to be retrieved from the HTTP server 218.

The messaging application 116 preloads video data in the cached video data 220 storage. The preloaded data is made available to the HTTP server 218, and when a request comes for data that has been cached, the HTTP server 218 serves that data from storage. However, if the data requested is not in the cached video data 220, then the HTTP server 218 acts as a proxy to get the data from the corresponding video source, such as the video servers 204 and 202. Once the data is retrieved, either from the cached video data 220 or from the video servers 202 and 204, the HTTP server 218 returns the data to the video player 226. From the video player 226's perspective, the video player 226 retrieves the video from an HTTP server, as it normally would. Therefore, no changes are needed in the video player 226 to implement the present embodiments. Further, it is noted that the data can be pre-loaded any time, even before the user requests the content, based on a prediction of when the user will view that content, or based or some other factor, such as preloading popular content to a large population right after a new release with the expectancy that many users will request the video. Thus, in some example embodiments, it is not a condition that the user requests the video before starting the preload.

The messaging application 116 interfaces with the social messaging system 130 to determine which videos to bundle for preload. For example, in one example embodiment, the social messaging system 130 determines which videos to bundle for preload, and in another example embodiment, the messaging application 116 determines which videos to bundle (e.g., a video sent from another user of the messaging application 116). In yet another example embodiment, either the social messaging system 130 or the messaging application 116 can select which videos to bundle for preloading.

When the messaging application 116 determines that a video needs to be preloaded, the messaging application 116 sends a message to the social messaging system 130 to download the bundle. In one example embodiment, when the social messaging system 130 determines that there is a video for preloading to the client device 110, the social messaging system 130 either sends a message to the client device 110 or waits for the messaging application 116 to log into the social messaging system 130 and then notifies the messaging application 116 that a bundle is being sent for storage in the cached video data 220.

When a determination is made that a video is to be bundled and preloaded, the social messaging system 130 creates the bundle by downloading the manifest from the corresponding video server (e.g., video server 204), and then downloading some of the video data to start streaming the video. In some example embodiments, the social messaging system 130 stores bundles in the bundle database 234, and if a requested bundle is already in the bundle database 234, then the data is retrieved from the bundle database 234 instead of from the video servers 202 and 204. After the manifest files and some of the video data are gathered, all the files are packed into a bundle (e.g., a zip file), and then the bundle is transmitted to the client device 110.

In some example embodiments, the messaging application 116 manages the bundles cached in the client device 110 to avoid utilizing too much memory space. For example, the messaging application 116 may utilize any of the following strategies: delete the bundle after the user has seen the video, delete the bundle after a predetermined amount of time has elapsed since the video was last seen (e.g., two days or one week, but other periods are also possible), delete the oldest bundle when the amount of data cached exceeds a predetermined threshold, or delete the bundle when the user deletes the video.

It is to be noted that the embodiments illustrated in FIG. 2 are examples and do not describe every possible embodiment. Other embodiments may utilize different amounts of bundled data, include additional HTTP servers, etc. The embodiments illustrated in FIG. 2 should therefore not be interpreted to be exclusive or limiting, but rather illustrative.

Figure 3:
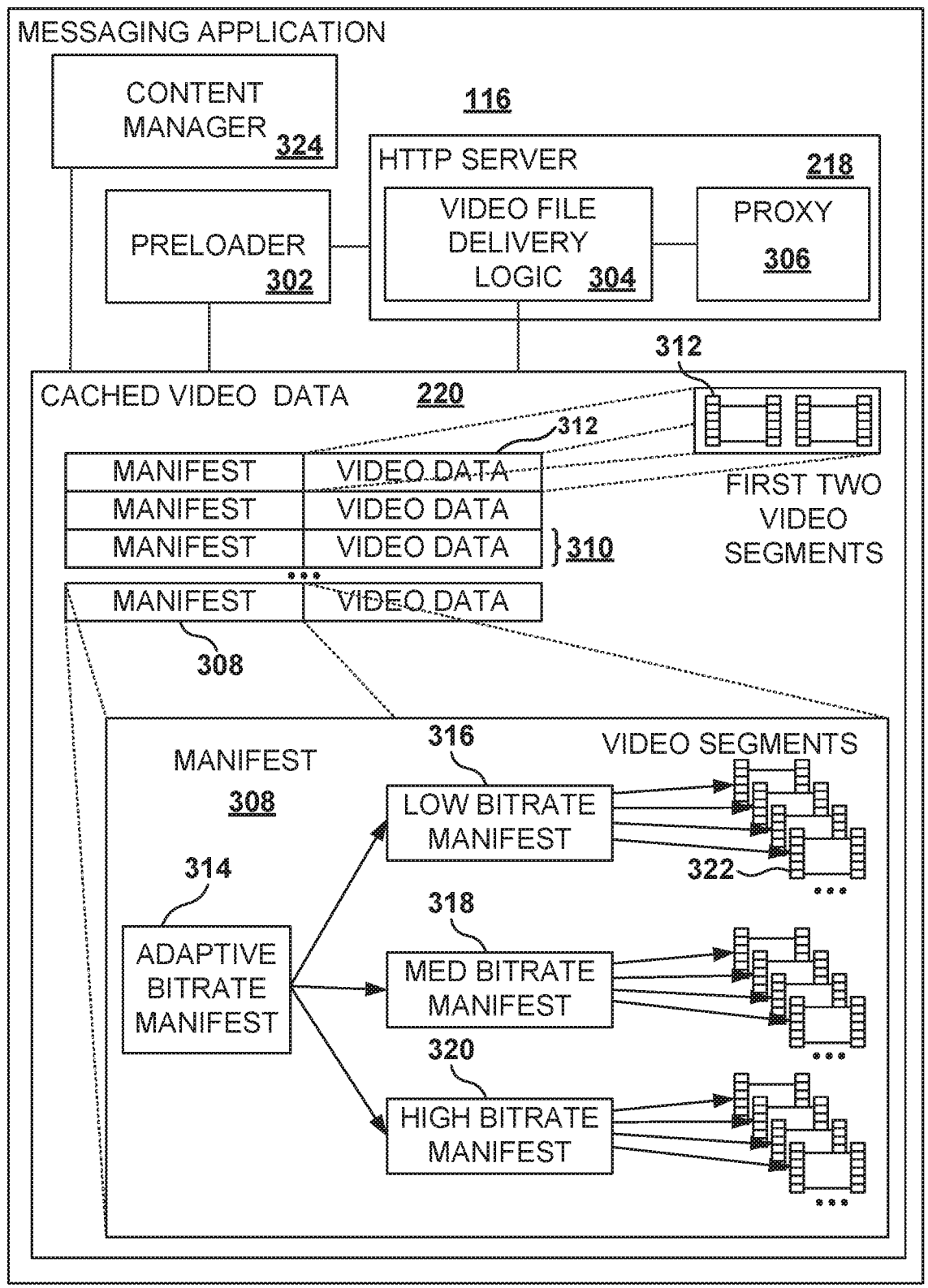
FIG. 3 illustrates components of a messaging application, according to some example embodiments, and data cached in memory.

FIG. 3 illustrates components of the messaging application 116, according to some example embodiments, and the data cached in memory. In one example embodiment, the messaging application 116 includes the HTTP server 218, the cached video data 220, a content manager 324, and a preloader 302. The content manager 324 manages the video data that is preloaded in the cached video data 220. In one embodiment, the content manager 324 determines which videos will be preloaded into the cached video data 220. As used herein, a video is set to be preloaded when a bundle 310 is created for the video and the bundle is stored in the cached video data 220. The complete content of the video does not have to be stored while preloading the video, although, in some example embodiments, all the data for a video stream may be bundled and preloaded.

The content manager 324 interacts with the social messaging system 130 to determine which videos are to be preloaded. In some example embodiments, the content manager 324 determines which video streams to be preloaded, while in other example embodiments, the social messaging system 130 notifies the content manager 324 of which videos will be preloaded. Further, the content manager 324 performs garbage collection operations on the cached video data 220 to delete old or obsolete content and manage the amount of storage used. The preloader 302 also interacts with the social messaging system 130 to download the bundles into the cached video data 220.

The HTTP server 218 includes a video file delivery logic 304 and a proxy 306. The video file delivery logic 304 includes instructions for determining which content is to be served from the cached video data 220 and which content is to be served from the video server via the proxy 306. When a request is received by the HTTP server 218 (e.g., a request for a video file sent by the video player 226), the video file delivery logic 304 checks to see if the requested file is present in the cached video data 220. If the file is present, the video file delivery logic 304 retrieves the file from the cached video data 220, and the HTTP server 218 returns the file to the requester. When the file is not present in the cached video data 220, the proxy 306 requests the file from the remote video server, and after the file is retrieved, the HTTP server 218 returns the file.

Embodiments illustrated herein are presented with reference to HLS, but the principles may be utilized for any type of video streaming based on the exchange of files, such as Microsoft Smooth Streaming or MPEG-DASH. HLS is an HTTP-based media streaming communications protocol that streams video by breaking the overall video stream into a sequence of small HTTP-based file downloads, each download loading one chunk of an overall potentially unbounded transport stream. A typical chunk may include about 10 seconds of video data, but other chunk sizes are possible, such as in the range from 1 to 30 seconds.

As the video stream is played, the client may select from a number of different alternate streams containing the same material encoded at a variety of data rates, allowing the streaming session to adapt to the available data rate. At the start of the streaming session, HLS downloads a manifest that contains the metadata for the various sub-streams (for the different video resolutions) which are available.

The source content is encoded at multiple bit rates, then each of the different bit rate streams are segmented into small multi-second parts (e.g, 2 to 10 seconds). The streaming client is made aware of the available streams at differing bit rates by a manifest 308 file. When starting, the client requests the segments from the lowest bit rate stream. If the client finds the download speed is greater than the bit rate of the segment downloaded, then the client may request the next higher bit rate segments. Later, if the client finds the download speed for a segment is lower than the bit rate for the segment, then the client may request a lower bit rate segment. The segment size can vary depending on implementation. In some example embodiments, the segment size is between two and ten seconds, but other segment sizes are possible.

In some example embodiments, the manifest 308 is a text-based file that directs the player to additional manifest files for each of the supported encoded streams. Each encoded stream is associated with a video resolution level. The manifest 308 includes some metadata that describes basic elements of the stream, and an ordered set of links, pointers, or addresses to video data for fragments of the video. By downloading each fragment of the video, also referred to herein as a chunk or segment, and playing the fragments back in sequence, the user is able to watch what appears to be a single continuous video.

In one example embodiment, the manifest 308 includes an adaptive bitrate manifest 314, which includes a list of pointers to other manifests that have information about files for a given video resolution. For example, a manifest may include from 1 to 10 different rendering resolutions, or more in some example embodiments. In the embodiment of FIG. 3, the manifest 308 includes three resolution levels. Therefore, the adaptive bitrate manifest 314 includes pointers to a low-bitrate manifest 316, a medium-bitrate manifest 318, and a high-bitrate manifest 320. Each of the bitrate manifests 316, 318, and 320 includes a list of pointers or addresses for each of one or more video segments 322.

In some example embodiments, the bundle 310 includes the files of the manifest 308 and video data 312. In one example embodiment, the video data 312 includes the video data for the first two video segments in the low bitrate manifest 316, but other implementations may include a different number of video segments and video segments for different resolutions. In one example embodiment, the video data 312 includes the video data for the first two ten-second chunks, but other embodiments may include smaller or bigger chunks and a different number of data files. In many implementations, the video player 226 will first request the low-resolution video data files. Therefore, caching the initial low-resolution video data files enables the video player 226 to start showing the video almost immediately.

It is to be noted that, in some example embodiments, the bundle 310 does not include all the video data to play the complete video stream. Further, it is also to be noted that in some example embodiments all the manifest index files are cached, but in other embodiments the bundle 310 includes manifest files for a subset of the different resolutions. In one example embodiment, the files for the low-bitrate manifest 316 are cached, but not the files for the medium- and high-bitrate manifests 318 and 320. In another example embodiment, the files for the low- and medium-bitrate manifests 316 and 318 are included in the bundle 310, but not the files for the high-bitrate manifest 320.

The example embodiments have enough video data to start playing the video right away, without having to access the network 104, but not too much data that would require a large amount of storage on the client device 110. In other example embodiments, only a portion of the data required to start the video is cached. In an example embodiment, half the data needed to start the video may be cached and the other half is downloaded when the user requests the video. This way, the user may have to wait a short time before the video starts playing, but the wait will be shorter than if no data were cached at all. In some example embodiments, the amount of data cached is adjusted based on system resources, such as amount available for storage or network bandwidth.

Figure 4:
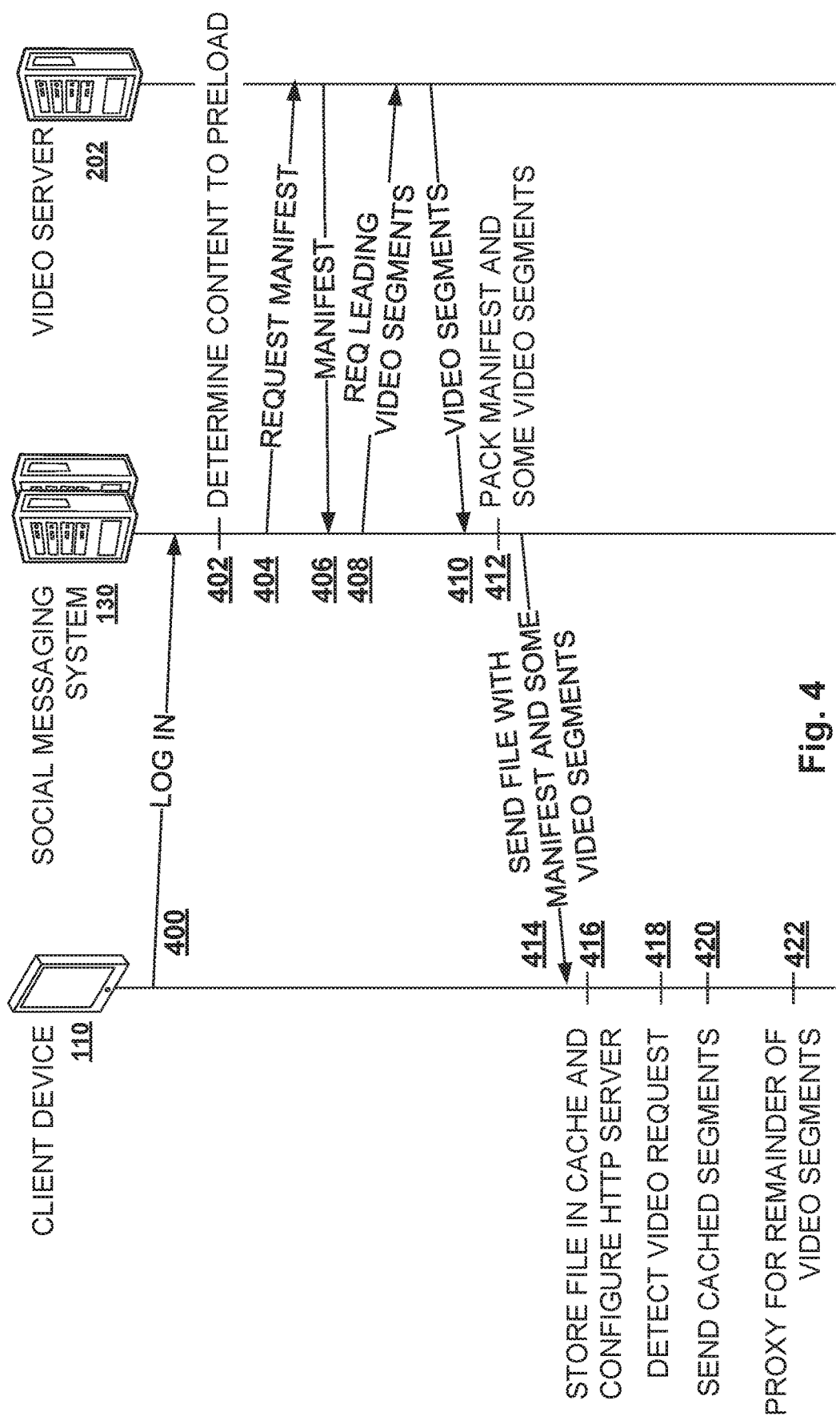
FIG. 4 illustrates interactions, according to some example embodiments, between a client device, a social messaging system, and a video server.

FIG. 4 illustrates interactions, according to some example embodiments, between the client device 110, the social messaging system 130, and the video server 202. At operation 400, the client device 110 logs in to the social messaging system 130. After the login, at operation 402, the social messaging system 130 determines which content is to be preloaded on the client device 110. It is to be noted that, in other example embodiments (not shown), the client device 110 sends a message to the social messaging system 130 indicating which files will be preloaded.

Once the social messaging system 130 identifies a video stream that needs to be bundled and preloaded, the social messaging system 130 identifies the video server 202 that holds the manifest for the video. At operation 404, the social messaging system 130 sends a request for the manifest to the video server 202. In response, the video server 202 returns the manifest to the social messaging system 130 during operation 406, including all the manifest index files, or at least the manifest index files for one resolution level, or a subset of manifest index files to get the video started (e.g., the first five manifest index files for the lowest-resolution rendering).

At operation 408, the social messaging system 130 requests the beginning video segments from the video server 202, or from another video server as indicated by the manifest index files. At operation 410, the video server 202 returns the requested video segments to the social messaging system 130. Once the manifest files for the bundle are available, as well as the initial video segments, the social messaging system 130 creates the bundle by packing the manifest and the video segments at operation 412. As used herein, packing files refers to the operation of creating one file with information and content for a plurality of files. In some example embodiments, the content of the bundle is compressed to reduce its size.

At operation 414, the social messaging system 130 sends the bundle file to the client device 110. Upon receiving the bundle file, at operation 416, the client device 110 stores the bundle file in the cache and configures the HTTP server to serve the files in the bundle from the cache instead of via proxy from a video server.

When the client device 110 detects a video request in operation 418, the client device 110 replies with the cached files in operation 420, or, in operation 422, acts as a proxy for the video segments that are not available in the cache by requesting the files from a remote video server, such as the video server 202.

Figure 5:
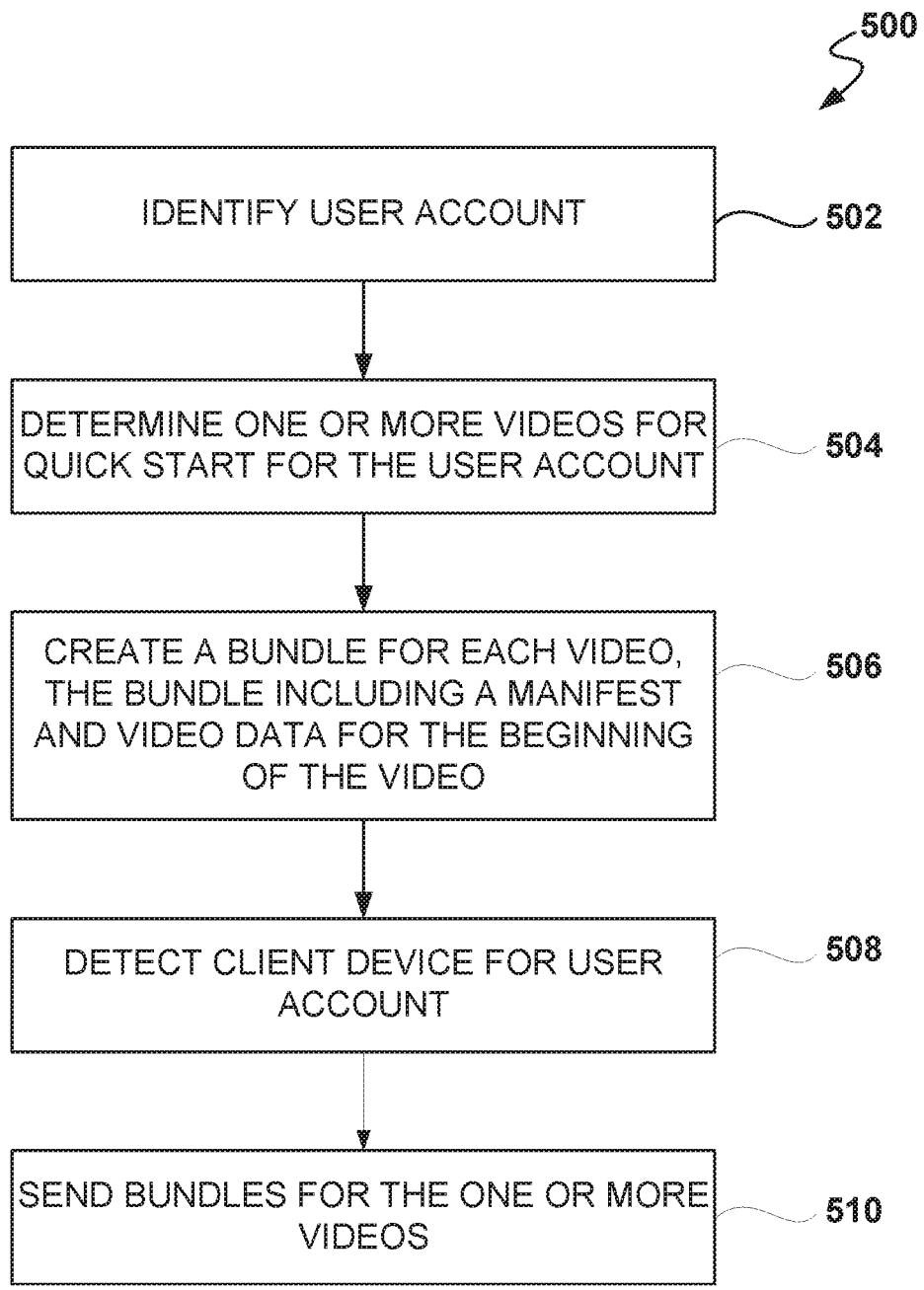
FIG. 5 is a flowchart of a method for creating bundles at the social messaging system, according to some example embodiments, for transmittal to the client device.

FIG. 5 is a flowchart of a method 500 for creating bundles at the social messaging system 130, according to some example embodiments, for transmittal to the client device 110. In operation 502, the social messaging system 130 server identifies a user account. From operation 502, the method 500 flows to operation 504, where the social messaging system 130 determines one or more videos to be preloaded at the client device 110 to be able to quickly start the presentation of the video. For example, the social messaging system 130 may detect a video sent by a friend of the user associated with the user account, and since there is a high probability that the user will request presentation of this video, the social messaging system 130 identifies the video in the message as a candidate for preloading.

In operation 506, a bundle is created for each of the videos identified in operation 504. Each bundle includes the manifest files and video data for the beginning of the video (e.g., the first three video chunks). In some example embodiments, the bundle includes a subset of the manifest files, such as the manifest index files for the lowest-resolution level, and the video data for the beginning of the video. From operation 506, the method 500 flows to operation 508, where the social messaging system 130 detects a client device 110 utilizing the identified user account. After detecting the client device 110, at operation 510, the social messaging system 130 sends one or more bundles for the identified one or more videos.

Figure 6:
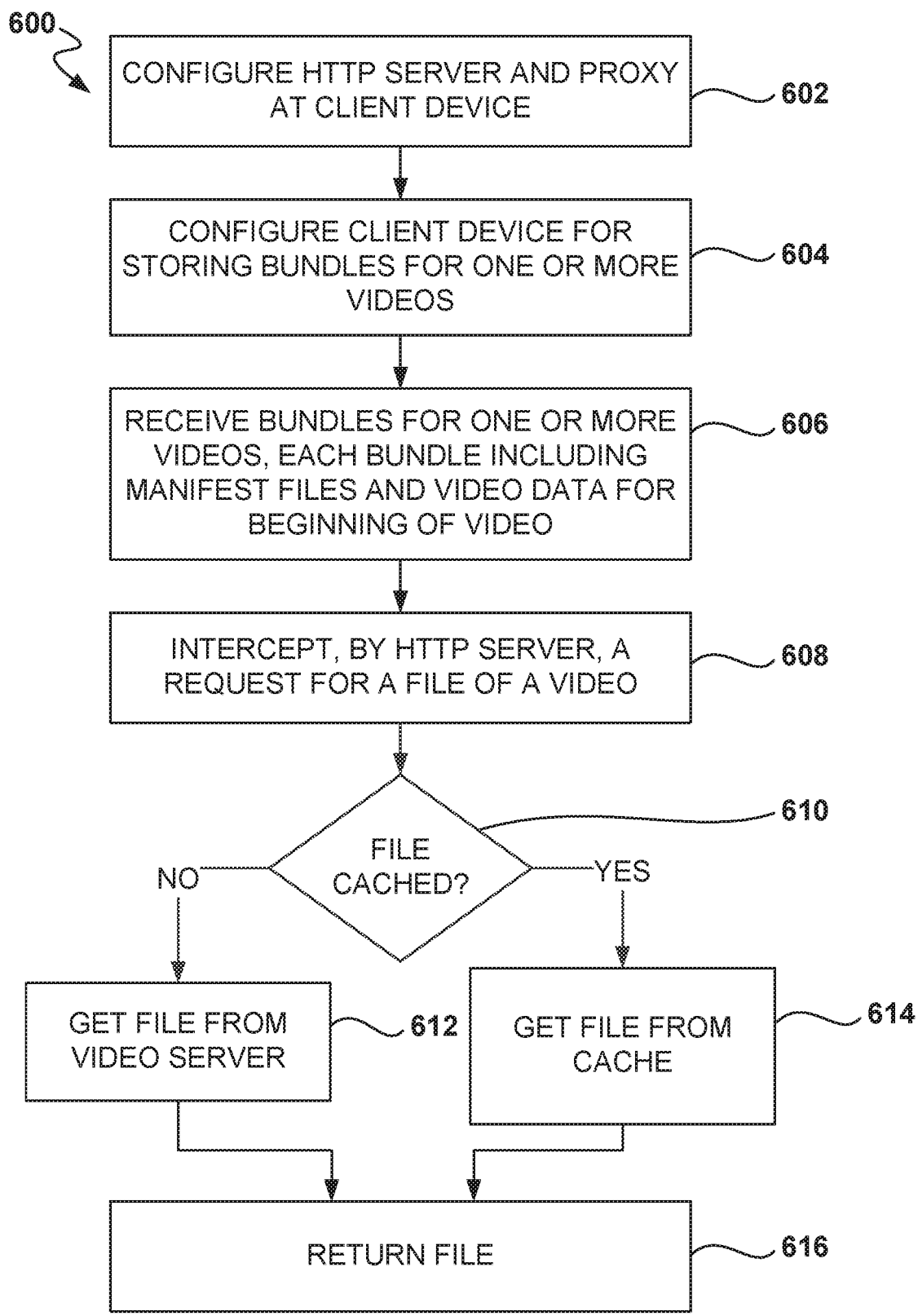
FIG. 6 is a flowchart of a method for the operation of a hypertext transfer protocol (HTTP) server, according to some example embodiments.
Figure 7:
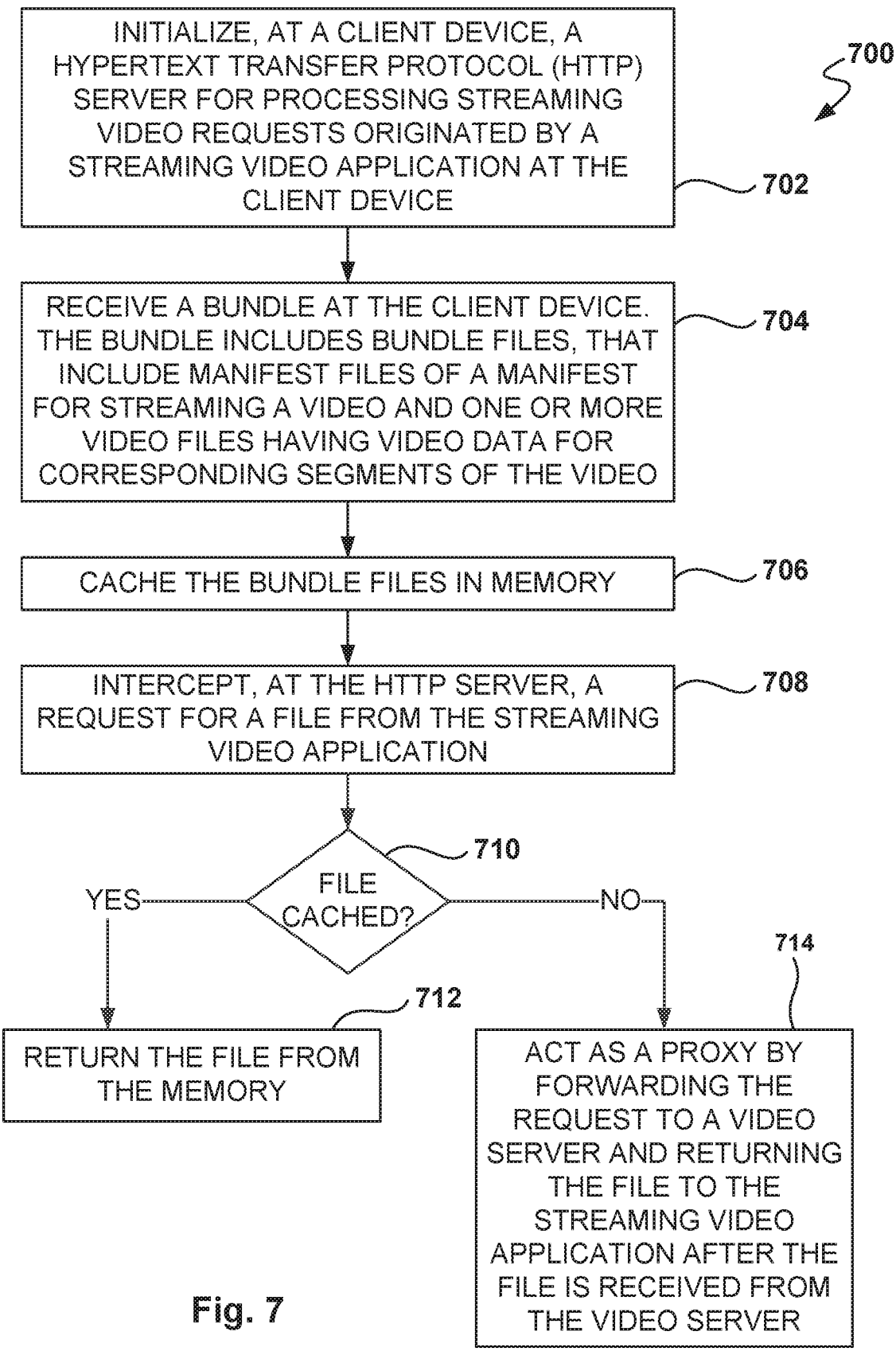
FIG. 7 is a flowchart of a method for streaming video, according to some example embodiments.

While the various operations in the flowcharts of FIGS. 5-7 are presented and described sequentially, one of ordinary skill will appreciate that some or all of the operations may be executed in a different order, be combined or omitted, or be executed in parallel.

FIG. 6 is a flowchart of a method 600 for the operation of an HTTP server, according to some example embodiments. In some example embodiments, the HTTP server resides at the client device 110. At operation 602, an application executed at the client device 110 (e.g., messaging application 116 as shown in FIG. 2) configures an HTTP server at the client device 110. The HTTP server may serve files from the cache or act as a proxy to get files from other servers.

From operation 602, the method 600 flows to operation 604, where the client device 110 is configured to store bundles for one or more videos that may be streamed to the client device 110. From operation 604, the method 600 flows to operation 606, where the application executed at the client device 110 receives bundles for the one or more videos. As discussed above, each bundle includes metadata files indicating where the video files reside, and one or more video data files. However, in some example embodiments, the bundle does not include all the video data required to present the complete video on the display.

At operation 608, the HTTP server intercepts a request for a file associated with a video stream. For example, the request may originate at the video player 226 that is part of the operating system 222 in the client device 110. After the request is intercepted by the HTTP server, a check is made in operation 610 to determine if the requested file is available from the cache. If the file is available in the cache, the method 600 flows to operation 614, and if the file is not available in the cache, the method 600 flows to operation 612.

At operation 612, the file is obtained from a remote video server. This means that the HTTP server acts as a proxy to request the file. At operation 614, the file is retrieved from the cache, the file being one of the files previously loaded in the cache after being received in one of the bundles. At operation 616, the file, either obtained from the remote video server or read from the cache, is returned to the requester.

FIG. 7 is a flowchart of a method 700 for streaming video, according to some example embodiments. At operation 702, a client device initializes an HTTP server for processing streaming video requests originated by a streaming video application at the client device. See for example the client device 110 and video player 226 of FIG. 2.

From operation 702, the method 700 flows to operation 704, where a bundle is received at the client device. The bundle includes bundle files, and each bundle file includes manifest files of a manifest for streaming a video and one or more video files having video data for corresponding segments of the video. See for example the bundle 310 in FIG. 3.

At operation 706, the bundle files are cached in memory (e.g., cached video data 220 in FIGS. 2 and 3). From operation 706, the method 700 flows to operation 708, where the HTTP server intercepts a request for a file from the streaming video application.

At operation 710, a check is made to determine if the requested file is available in the cache. If the file is available in the cache, the file is retrieved from memory and returned in operation 712. If the file is not available in the cache, at operation 714, the HTTP server acts as a proxy and forwards the request to a video server. After the video server returns the file, the HTTP server returns the file to the requester, e.g., the streaming video application.

While the operations of method 700 are presented as flowing from one operation to the next, in various other embodiments, the operations are performed with intervening operations, repeated operations, or are combined in various ways to achieve improved starting of video display.

Additionally, in some example embodiments according to method 700, the one or more video files include a first video file with video data for an initial video segment of the video and a second video file with video data for a video segment that immediately follows the initial video segment of the video. In one example embodiment, where the one or more video files include video data for a low-resolution rendition of the video, the one or more video files are indexed in a low-resolution index file in the manifest files. In some example embodiments, a social messaging system interfaces with the video server to obtain the bundle files, where the social messaging system creates the bundle with the obtained bundle files and the social messaging system sends the bundle to the client device. In some example embodiments, the social messaging system determines additional videos to be bundled for transmission to the client device, and the method 700 further includes an operation for caching additional bundle files of the additional videos at the client device.

In one aspect, when the one or more video files are cached in memory, the streaming video application starts presenting the video without having to wait for video data to be received from the video server, and after the one or more video files are returned, the HTTP server acts as a proxy to forward requests for additional video files to the video server. In one example embodiment, the HTTP server interfaces with a communication module in the client device to intercept the request. In some example embodiments, the method 700 further includes operations for determining, by a content manager at the client device, additional videos for caching in respective bundles at the client device, and for requesting, by the content manager, the bundles from a social messaging system. In some example embodiments, the method 700 further includes an operation for erasing the bundle files from the memory after a predetermined amount of time has elapsed without any of the bundle files being requested. In some example embodiments, the manifest files include a bundle index file, a low-resolution index file, a medium-resolution index file, and a high-resolution index file.

Figure 8:
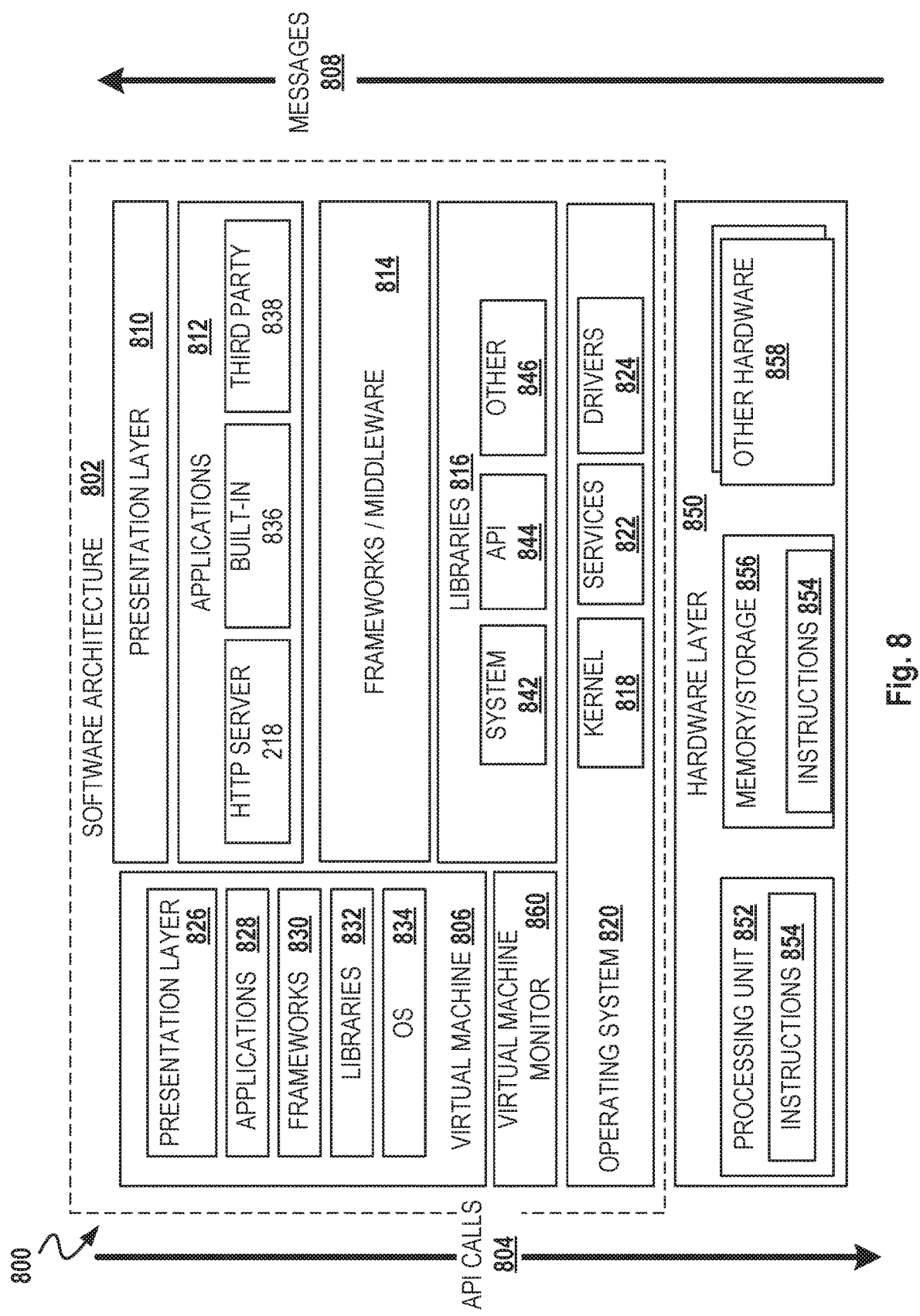
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture 802 and it will be appreciated that many other architectures may be implemented to facilitate the functionality described herein. The software architecture 802 may be executing on hardware such as a machine 900 of FIG. 9 that includes, among other things, processors 904, memory/storage 906, and I/O components 918. A representative hardware layer 850 is illustrated and can represent, for example, the machine 900 of FIG. 9. The representative hardware layer 850 comprises one or more processing units 852 having associated executable instructions 854. The executable instructions 854 represent the executable instructions of the software architecture 802, including implementation of the methods, modules, and so forth of FIGS. 1-7. The hardware layer 850 also includes memory and/or storage modules 856, which also have the executable instructions 854. The hardware layer 850 may also comprise other hardware 858, which represents any other hardware of the hardware layer 850, such as the other hardware illustrated as part of the machine 900.

In the example architecture of FIG. 8, the software architecture 802 may be conceptualized as a stack of layers where each layer provides particular functionality. For example, the software architecture 802 may include layers such as an operating system 820, libraries 816, frameworks/middleware 814, applications 812, and a presentation layer 810. Operationally, the applications 812 and/or other components within the layers may invoke API calls 804 through the software stack and receive a response, returned values, and so forth illustrated as messages 808 in response to the API calls 804. The layers illustrated are representative in nature and not all software architectures have all layers. For example, some mobile or special-purpose operating systems may not provide a frameworks/middleware layer 814, while others may provide such a layer. Other software architectures may include additional or different layers.

The operating system 820 may manage hardware resources and provide common services. The operating system 820 may include, for example, a kernel 818, services 822, and drivers 824. The kernel 818 may act as an abstraction layer between the hardware and the other software layers. For example, the kernel 818 may be responsible for memory management, processor management (e.g., scheduling), component management, networking, security settings, and so on. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 812 and/or other components and/or layers. The libraries 816 typically provide functionality that allows other software modules to perform tasks in an easier fashion than to interface directly with the underlying operating system 820 functionality (e.g., kernel 818, services 822, and/or drivers 824). The libraries 816 may include system libraries 842 (e.g., C standard library) that may provide functions such as memory allocation functions, string manipulation functions, mathematic functions, and the like. In addition, the libraries 816 may include API libraries 844 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 846 to provide many other APIs to the applications 812 and other software components/modules.

The frameworks 814 (also sometimes referred to as middleware) may provide a higher-level common infrastructure that may be utilized by the applications 812 and/or other software components/modules. For example, the frameworks 814 may provide various graphic user interface (GUI) functions, high-level resource management, high-level location services, and so forth. The frameworks 814 may provide a broad spectrum of other APIs that may be utilized by the applications 812 and/or other software components/modules, some of which may be specific to a particular operating system or platform.

The applications 812 include the HTTP server 218, built-in applications 836, and/or third-party applications 838. Examples of representative built-in applications 836 may include, but are not limited to, a contacts application, a browser application, a book reader application, a location application, a media application, a messaging application, and/or a game application. The third-party applications 838 may include any of the built-in applications 836 as well as a broad assortment of other applications. In a specific example, the third-party application 838 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 838 may invoke the API calls 804 provided by the mobile operating system such as the operating system 820 to facilitate functionality described herein.

The applications 812 may utilize built-in operating system functions (e.g., kernel 818, services 822, and/or drivers 824), libraries (e.g., system libraries 842, API libraries 844, and other libraries 846), or frameworks/middleware 814 to create user interfaces to interact with users of the system. Alternatively, or additionally, in some systems, interactions with a user may occur through a presentation layer, such as the presentation layer 810. In these systems, the application/module "logic" can be separated from the aspects of the application/module that interact with a user.

Some software architectures utilize virtual machines. In the example of FIG. 8, this is illustrated by a virtual machine 806. A virtual machine creates a software environment where applications/modules can execute as if they were executing on a hardware machine (such as the machine 900 of FIG. 9, for example). The virtual machine 806 is hosted by a host operating system (operating system 820 in FIG. 8) and typically, although not always, has a virtual machine monitor 860, which manages the operation of the virtual machine 806 as well as the interface with the host operating system (i.e., operating system 820). A software architecture executes within the virtual machine 806, such as an operating system 834, libraries 832, frameworks/middleware 830, applications 828, and/or a presentation layer 826. These layers of software architecture executing within the virtual machine 806 can be the same as corresponding layers previously described or may be different.

Figure 9:
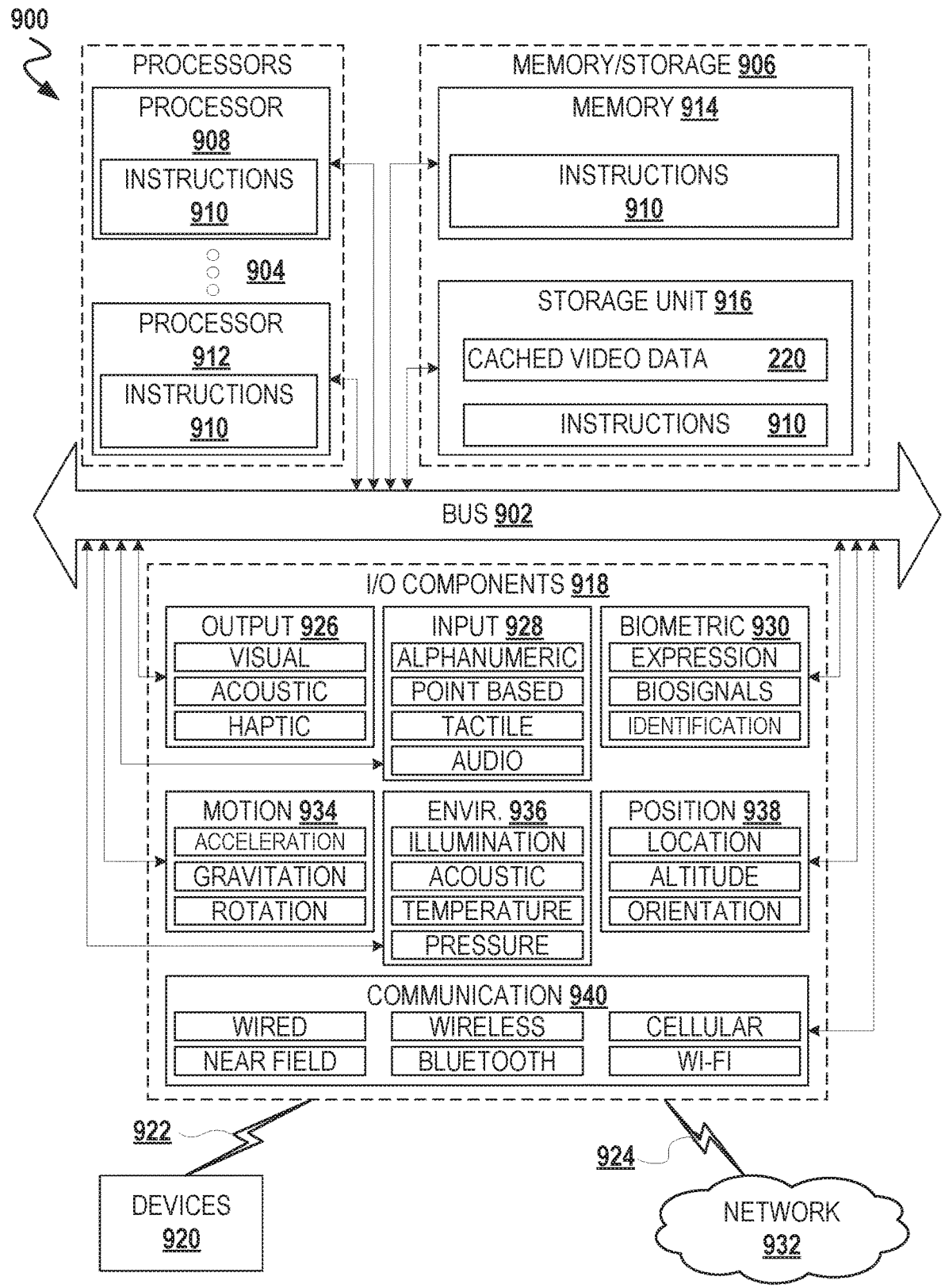
FIG. 9 is a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. For example the instructions 910 may cause the machine 900 to execute the flow diagrams of FIGS. 5-7. Additionally, or alternatively, the instructions 910 may implement the video preloader module 160, the messaging application 116, the cached video data 220, the HTTP server 218, and the social messaging system 130 of FIGS. 1-4, and so forth. The instructions 910 transform the general, non-programmed machine 900 into a particular machine 900 programmed to carry out the described and illustrated functions in the manner described.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines 900 that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that may execute the instructions 910. The term "processor" is intended to include a multi-core processor that may comprise two or more independent processors (sometimes referred to as "cores") that may execute instructions contemporaneously. Although FIG. 9 shows multiple processors 904, the machine 900 may include a single processor with a single core, a single processor with multiple cores (e.g., a multi-core processor), multiple processors with a single core, multiple processors with multiples cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The storage unit 916 may further include the cached video data 220. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of the processors 904 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 910. The term "machine-readable medium" shall also be taken to include any medium, or combination of multiple media, that is capable of storing instructions (e.g., instructions 910) for execution by a machine (e.g., machine 900), such that the instructions, when executed by one or more processors of the machine (e.g., processors 904), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 918 may include a wide variety of components to receive input, provide output, produce output, transmit information, exchange information, capture measurements, and so on. The specific I/O components 918 that are included in a particular machine will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via a coupling 924 and a coupling 922 respectively. For example, the communication components 940 may include a network interface component or other suitable device to interface with the network 932. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

In various example embodiments, one or more portions of the network 932 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 932 or a portion of the network 932 may include a wireless or cellular network and the coupling 924 may be a Code Division Multiple Access (CDMA) connection, a Global System for Mobile communications (GSM) connection, or another type of cellular or wireless coupling. In this example, the coupling 924 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 910 may be transmitted or received over the network 932 using a transmission medium via a network interface device (e.g., a network interface component included in the communication components 940) and utilizing any one of a number of well-known transfer protocols (e.g., HTTP). Similarly, the instructions 910 may be transmitted or received using a transmission medium via the coupling 922 (e.g., a peer-to-peer coupling) to the devices 920. The term "transmission medium" shall be taken to include any intangible medium that is capable of storing, encoding, or carrying the instructions 910 for execution by the machine 900, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    initializing, by a client device, a hypertext transfer protocol (HTTP) server for processing streaming video requests originated by a streaming video application, wherein the client device includes a memory, one or more processors, the HTTP server, and the streaming video application;
    receiving a bundle by the client device, the bundle including bundle files, the bundle files including manifest files of a manifest for streaming a video and one or more video files having video data for corresponding segments of the video;
    caching the bundle files in the memory included in the client device;
    intercepting, by the HTTP server, a request from the streaming video application, the request including an identification of a requested file;
    when the requested file is a file included in the bundle files cached in the memory, transmitting the file included in the bundle files from the memory to the streaming video application;
    when the requested file is absent from the memory, forwarding the request by the HTTP server to a video server and transmitting by the HTTP server the requested file to the streaming video application after the requested file is received from the video server; and
    erasing the bundle files from the memory after a predetermined amount of time has elapsed without any of the bundle files being requested.

2. The method as recited in claim 1, wherein the one or more video files comprise:
    a first video file with video data for an initial video segment of the video; and
    a second video file with video data for a video segment that immediately follows the initial video segment of the video.

3. The method as recited in claim 1, wherein the one or more video files include video data for a low-resolution rendition of the video, wherein the one or more video files are indexed in a low-resolution index file in the manifest files.

4. The method as recited in claim 1, wherein a social messaging system interfaces with the video server to obtain the bundle files, wherein the social messaging system creates the bundle with the obtained bundle files, wherein the social messaging system sends the bundle to the client device.

5. The method as recited in claim 4, wherein the social messaging system determines additional videos to be bundled for transmission to the client device, the method further comprising:
caching additional bundle files of the additional videos in the memory included in client device.

6. The method as recited in claim 1, wherein, when the one or more video files are cached in the memory, the streaming video application starts presenting the video without having to wait for video data to be received from the video server, wherein, after the requested file is transmitted, the HTTP server forwards requests for additional video files to the video server.

7. The method as recited in claim 1, wherein the HTTP server interfaces with a communication module in the client device to intercept the request.

8. The method as recited in claim 1, further comprising:
determining, by a content manager included in the client device, additional videos for caching in respective bundles in the memory included in the client device; and
requesting, by the content manager, the bundles from a social messaging system.

9. The method as recited in claim 1, wherein the manifest files comprise a bundle index file, a low-resolution index file, a medium-resolution index file, and a high-resolution index file.

10. A client device comprising:
an hypertext transfer protocol (HTTP) server;
a streaming video application;
a memory comprising instructions; and
one or more computer processors, wherein the instructions, when executed by the one or more computer processors, cause the one or more computer processors to perform operations comprising:
initializing the HTTP server for processing streaming video requests originated by the streaming video application;
receiving a bundle including bundle files, the bundle files including manifest files of a manifest for streaming a video and one or more video files having video data for corresponding segments of the video;
caching the bundle files in the memory included in the client device;
intercepting, using the HTTP server, a request from the streaming video application, the request including an identification of a requested file;
when the requested file is a file included in the bundle files cached in the memory, transmitting the file included in the bundle files from the memory;
when the requested file is absent from the memory, forwarding the request using the HTTP server to a video server and transmitting using the HTTP server the requested file to the streaming video application after the requested file is received from the video server; and
erasing the bundle files from the memory after a predetermined amount of time has elapsed without any of the bundle files being requested.

11. The client device as recited in claim 1, wherein the one or more video files comprise:
a first video file with video data for an initial video segment of the video; and
a second video file with video data for a video segment that immediately follows the initial video segment of the video.

12. The client device as recited in claim 10, wherein the one or more video files include video data for a low-resolution rendition of the video, wherein the one or more video files are indexed in a low-resolution index file in the manifest files.

13. The client device as recited in claim 10, wherein a social messaging system interfaces with the video server to obtain the bundle files, wherein the social messaging system creates the bundle with the obtained bundle files, wherein the social messaging system sends the bundle to the client device.

14. The client device as recited in claim 13, wherein the social messaging system determines which videos are bundled for transmission to the client device.

15. A non-transitory machine-readable storage medium including instructions that, when executed by a machine, cause the machine to perform operations comprising:
initializing a hypertext transfer protocol (HTTP) server included in a client device for processing streaming video requests originated by a streaming video application included in the client device;
receiving a bundle including bundle files, the bundle files including manifest files of a manifest for streaming a video and one or more video files having video data for corresponding segments of the video;
caching the bundle files in memory included in the client device;
intercepting, using the HTTP server, a request from the streaming video application, the request including an identification of a requested file;
when the requested file is a file included in the bundle files cached in the memory, transmitting the file included in the bundle files from the memory to the streaming video application;
when the requested file is absent from the memory, forwarding the request using the HTTP server to a video server and transmitting using the HTTP server the requested file to the streaming video application after the requested file is received from the video server; and
erasing the bundle files from the memory after a predetermined amount of time has elapsed without any of the bundle files being requested.

16. The machine-readable storage medium as recited in claim 15, wherein, when the one or more video files are cached in the memory, the streaming video application starts presenting the video without having to wait for video data to be received from the video server, wherein, after the requested file is transmitted, the HTTP server forwards requests for additional video files to the video server.

17. The machine-readable storage medium as recited in claim 15, wherein the one or more video files comprise:
a first video file with video data for an initial video segment of the video;
a second video file with video data for a second video segment that immediately follows the initial video segment of the video; and a third video file with video data for a third video segment that immediately follows the second video segment of the video.

18. The machine-readable storage medium as recited in claim 15, wherein the manifest files comprise a bundle index file, a low-resolution index file, a medium-resolution index file, and a high-resolution index file.

* * * * *

UNITED STATES PATENT AND TRADEMARK OFFICE
CERTIFICATE OF CORRECTION

PATENT NO. : 10,749,925 B1
APPLICATION NO. : 15/255322
DATED : August 18, 2020
INVENTOR(S) : Hudgin et al.

Page 1 of 1

It is certified that error appears in the above-identified patent and that said Letters Patent is hereby corrected as shown below:

In the Claims

Column 20, Line 4, Claim 11, delete "claim 1," and insert --claim 10-- therefor

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*